June 28, 1938.  C. G. HALPINE  2,121,795

SPIN RECOVERY DEVICE

Filed Aug. 9, 1937

INVENTOR
CHARLES G. HALPINE
BY
*Robert A. Lavender*
ATTORNEY

Patented June 28, 1938

2,121,795

UNITED STATES PATENT OFFICE 2,121,795

SPIN RECOVERY DEVICE

Charles G. Halpine, Washington, D. C.

Application August 9, 1937, Serial No. 158,243

3 Claims. (Cl. 244—87)

(Granted under the act of March 3, 1883, as amended April 30, 1928; 370 O. G. 757)

This device relates to aircraft and has particular relation to devices employed as a means for controlling aircraft in flight.

The principal object of the invention is to provide a means of control of the character described whereby the aircraft may recover normal flight from a "spinning" condition either in the incipiency of that condition or after the spinning condition has fully developed.

Another object of the invention is to provide a means to assist or even to supplant the elevators of the aircraft while in normal flight.

With these and other objects in view, the invention consists in the construction, combination and arrangement of parts as will be described more fully hereinafter.

Figure 1:
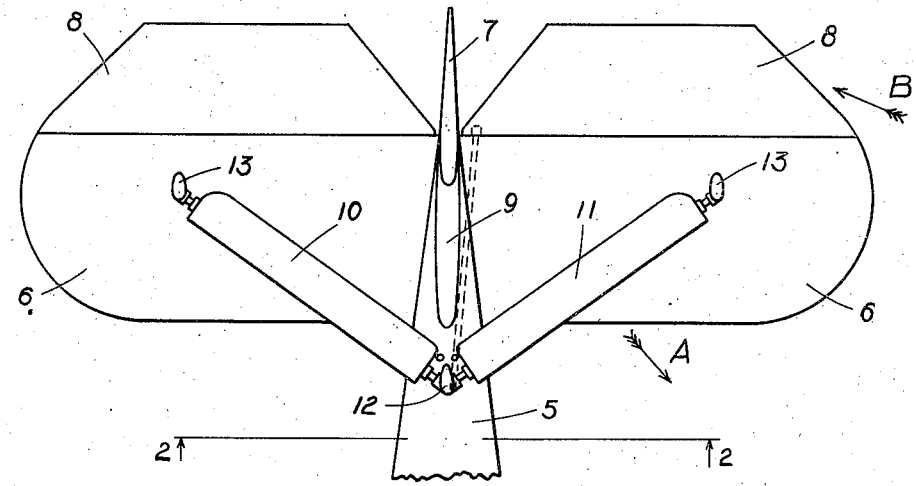

Reference is to be had to the accompanying drawing forming a part of this specification in which like reference characters indicate corresponding parts throughout the several views, and in which Fig. 1 is a plan view of the spin recovery device, mounted at the empennage of a conventional aircraft.

Figure 2:
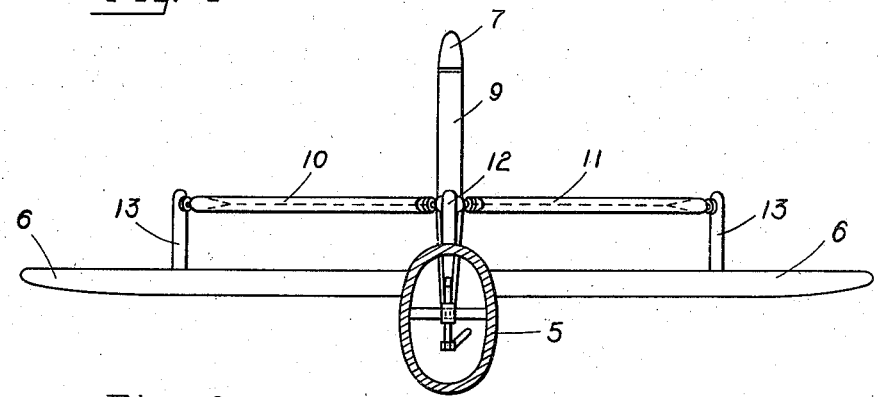
Figure 3:
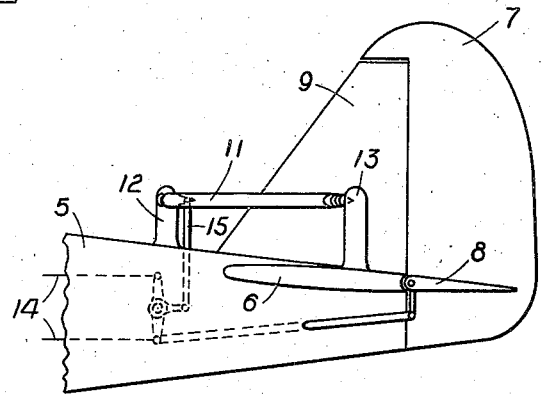

Fig. 2 is a sectional view on the line 2—2 of Fig. 1, showing the empennage in front elevation, and Fig. 3 is a side elevation of Fig. 1.

Referring more particularly to the drawing, 5 indicates the empennage of an aircraft equipped with the usual horizontal stabilizers 6, rudder 7, elevator 8 and vertical stabilizer 9.

The present invention consists of vanes 10 and 11 having an angle of sweepback of approximately 45 degrees relative to the air flow in normal straight flight of the aircraft. They are of airfoil cross-section and are mounted to oscillate in suitable supports about their longitudinal axes, and are mounted proximate to the empennage on either side of the longitudinal axis of the aircraft. The forward, or inner ends, of the vanes are pivotally mounted in a suitable common support 12 carried by the fuselage, and their rearward, or outer ends are pivotally mounted in suitable posts, or other supports 13 attached to the stabilizers 6. Although I have shown the supports for the vanes attached to the fuselage and stabilizers, it will be understood that other suitable locations may be selected without interference with the proper functioning of the vanes.

The vanes are controlled by the operator of the aircraft through the usual elevator control system, they being connected therewith by a suitable linkage 15, as seen as in Fig. 3.

In normal straight flight of the aircraft the lift on the vanes is relatively small due to the effective aerodynamic section presented to the flow of air and will act as auxiliary elevators of relatively low-lift values. However, in a spin, the airflow conditions about the tail of the aircraft are materially different. For example, should the aircraft be in a flat spin to the right, the tail is continuously moving, relative to the air, in the direction of arrow A in Fig. 1 and downward at the same time due to the aircraft's descent. The effect of this motion blankets a large portion of the rudder 7 and vertical stabilizer 9 in turbulent air, due to the high angle of attack of the horizontal stabilizer, causing the rudder and vertical stabilizer to have little effect in retarding the spinning motion. At the same time the air passing across the elevators 8 is at such an angle, indicated by arrow B, as to render them also of little effect. However, in contradistinction, the vane 11 will be presented practically normal to the direction of airflow and will exert a greater lift than when the plane is in normal flight. Furthermore, the vane 11 is clear of the turbulent air sweeping up and back over the horizontal stabilizers, thus being in a position to render effective lift at the tail. By means of the controls the angle of attack of the vane 11 is increased, lifting the tail (and depressing the nose) of the aircraft. During the motion of lifting the tail the angle of attack of the horizontal stabilizer is greatly decreased reducing its "stalled" condition, which at the same time reduces the turbulence of the airflow in the vicinity of the vertical stabilizer and rudder, and restores more of their area to effectiveness thus retarding the spinning motion. This motion of lifting the tail provides the effect for initial retardation of the yawing motion of the whole aircraft. With the initial retardation of the spinning motion and with the tail sufficiently up to reduce the angle of attack of the horizontal stabilizer below the stalling angle, full effectiveness of the rudder and vertical stabilizer is restored and normal control of the aircraft is regained.

It will be understood that the above description and accompanying drawing comprehend only the general and preferred embodiment of my invention and that various changes in details of construction, proportion and arrangement of parts may be made within the scope of the appended claims and without sacrificing any of the advantages of my invention.

The invention herein described and claimed may be used and/or manufactured by or for the Government of the United States of America for governmental purposes without the payment of any royalties thereon or therefor.

I claim:

1. In combination with the empennage of an aircraft, vanes having an angle of sweep-back of approximately 45 degrees mounted proximate to the empennage in a plane approximately parallel to the plane containing the X and Y axes of the aircraft, and means for changing the angle of attack of the vanes connected with the elevator control system whereby the vanes move in unison with the elevator.

2. In combination with the empennage of an aircraft, vanes having an angle of sweepback mounted proximate to the empennage in a plane approximately parallel to the plane containing the X and Y axes of the aircraft and positioned in unobstructed airflow when the aircraft is in a spin, and means for changing the angle of attack of the vanes connected with the elevator control system whereby the vanes move in unison with the elevator.

3. In combination with the empennage of an aircraft, vanes having an angle of sweepback of approximately 45 degrees mounted proximate to the empennage in a plane approximately parallel to the plane containing the X and Y axes of the aircraft and positioned in unobstructed airflow when the aircraft is in a spin, and means for changing the angle of attack of the vanes connected with the elevator control system whereby the vanes move in unison with the elevator.

CHARLES G. HALPINE.